United States Patent
Kruse

(10) Patent No.: US 7,442,117 B2
(45) Date of Patent: Oct. 28, 2008

(54) SUSPENSION FOR A SAUSAGE FILLING PIPE

(75) Inventor: Holger Kruse, Hamburg (DE)

(73) Assignee: TIPPER TIE technopack, GmbH, Glinde (DE)

( * ) Notice: Subject to any disclaimer, the term of this patent is extended or adjusted under 35 U.S.C. 154(b) by 0 days.

(21) Appl. No.: 11/596,529

(22) PCT Filed: May 12, 2005

(86) PCT No.: PCT/EP2005/005186

§ 371 (c)(1),
(2), (4) Date: Nov. 13, 2006

(87) PCT Pub. No.: WO2005/110099

PCT Pub. Date: Nov. 24, 2005

(65) Prior Publication Data

US 2007/0243805 A1 Oct. 18, 2007

(30) Foreign Application Priority Data

May 12, 2004 (DE) .................. 20 2004 007 788

(51) Int. Cl.
*A22C 11/00* (2006.01)
(52) U.S. Cl. ........................................................ 452/31
(58) Field of Classification Search ............ 452/21–26, 452/30–37, 46, 51
See application file for complete search history.

(56) References Cited

U.S. PATENT DOCUMENTS

| 3,964,236 | A | * | 6/1976 | Smith | 452/34 |
| 4,376,327 | A | * | 3/1983 | Curtis | 452/43 |
| 4,893,377 | A | * | 1/1990 | Evans et al. | 452/34 |
| 4,991,260 | A | * | 2/1991 | Nausedas | 452/35 |
| 7,306,511 | B2 | * | 12/2007 | Whittlesey et al. | 452/45 |

FOREIGN PATENT DOCUMENTS

EP 2005/005186 11/2006

* cited by examiner

*Primary Examiner*—Thomas Price
(74) *Attorney, Agent, or Firm*—Casimir Jones, S.C.

(57) ABSTRACT

The subject matter of the invention is a suspension for a sausage filling pipe (3), with a filling pipe connection piece (4) and a filling machine connection piece (5), the filling pipe connection piece (4) being pivotable in relation to the filling machine connection piece (5) about a first pivot axis. The suspension is distinguished in that the filling pipe connection piece (4) is arranged on a frame (8) and is pivotable in relation to the latter about the first pivot axis, and the frame (8), for its part, is pivotable together with the filling pipe connection piece (4) in relation to the filling machine connection piece (5) about a second pivot axis into at least one cleaning position in which it holds the filling pipe connection piece (4) in a stable manner. This permits a simple and safe cleaning of the filling pipe connection piece (4).

4 Claims, 3 Drawing Sheets

SUSPENSION FOR A SAUSAGE FILLING PIPE

The invention relates to a suspension for a sausage filling pipe according to the precharacterizing clause of patent claim 1.

During the filling of sausages, sausage meat in pasty form is filled into the tubular sausage skin and the sausage skin is then sealed section by section. The sections divided off in this manner are then the individual sausages. A filling machine usually fills the meat into one end of a filling pipe. The empty sausage skin is pulled over the other, free end. Since the skin is sealed at the free end on one side, it is filled and is gradually pulled off from the pipe by the pressure of the following meat. The skin filled in this manner is then supplied to a sealing machine which seals it section by section.

The free end of the filling pipe is situated relatively close to the sealing machine. For space reasons, it is therefore virtually impossible to pull a sausage skin onto the filling pipe if the filling pipe is in its operating position. The filling pipe is therefore usually configured such that it is pivotable, so that the free end is easily accessible and a new skin can easily be pulled onto it. In detail, a suspension of the generic type accordingly comprises a filling pipe connection piece which is either part of the pipe or to which the pipe can be fastened, for example by screwing it on, and a filling machine connection piece matching the filling pipe connection piece. The filling machine connection piece may be a fixed component part of the filling machine or may be connectable thereto. However, it may also be part of the sealing machine or may be connectable thereto or may be a completely independent device. It is crucial that it follows the filling pipe connection piece, as seen from the filling pipe. By the filling pipe connection piece being pivotable in relation to the filling machine connection piece, the capability of the filling pipe to pivot, which is required for pulling on a new skin, is also provided.

In the event that the suspension has to be cleaned, a means of being able to release the filling pipe connection piece from the filling machine connection piece has generally additionally been provided in the prior art. For the cleaning, the filling pipe connection piece can therefore be separated from the entire device and then cleaned, for example, on a table.

However, this is awkward and, in view of the generally not inconsiderable weight of the filling pipe connection piece, not entirely without hazard.

The invention therefore has the object of permitting simpler and safer cleaning of the filling pipe connection piece.

It achieves this object by means of the features of the characterizing part of patent claim 1.

In this case, the filling pipe connection piece and the filling machine connection piece can be configured as desired. It is crucial that a connection of filling pipe and filling machine can be produced with them.

The first pivot axis has to be positioned in such a manner that, during the pivoting of the filling pipe connection piece about this axis, the free end of the filling pipe can come free, i.e. a skin can be comfortably pulled on. Otherwise, the pivotability can be achieved in any desired manner. Pivotability within the context of the invention also includes rotatability, i.e. a rotatability about the center of gravity of the connection piece without changing the position of the center of gravity.

The second pivot axis can have any desired position apart from that of the first. The cleaning position is a position in which a simpler cleaning of the filling pipe connection piece, which is still situated on the frame, is possible. The position of the cleaning position is advantageously such that it is reached after the frame pivoted through 90° or more about the second axis. Pivotability through approximately 180°, i.e. more than 170° is particularly advantageous, since the filling pipe connection piece is then most easily accessible.

Furthermore, the frame in which the filling pipe connection piece is arranged can be configured virtually as desired. However, it has to be able also to hold the filling pipe connection piece when the filling pipe is fitted. If it is pivoted into the cleaning position, it has to be able at least to hold the filling pipe connection piece without the filling pipe in a stable manner. In a stable manner means that the user does not have to support it in order to hold the filling pipe connection piece in position. The user then has both hands free in order to grasp and to operate a hose and other cleaning tools. Furthermore, the pivotability of the filling pipe connection piece has to be provided again in such a manner that the free end of the fitted filling pipe can come free.

In at least one cleaning position of the frame, the filling pipe connection piece is advantageously pivotable in relation to said frame about the cleaning axis. The user, by pivoting the connection piece in the frame, can therefore more easily reach a plurality of locations to be cleaned. The pivotability about the cleaning axis can be achieved in a particularly simple manner by the first axis, which has been offset by pivoting the frame, being designated the cleaning axis. In this case, it is particularly advantageous if a pivoting through 360° is possible, since then all of the sides of the connection piece are easily accessible to the user from one side.

The frame is advantageously lockable in relation to the filling machine connection piece in an operating position. The operating position here is the position in which the filling machine can fill sausage meat into the filling pipe. Lockable in relation to the filling machine connection piece means that, in the locked position, the frame cannot be moved in relation to the filling machine connection piece.

An exemplary embodiment of the invention is explained in more detail below with reference to drawings, in which.

Figure 1:
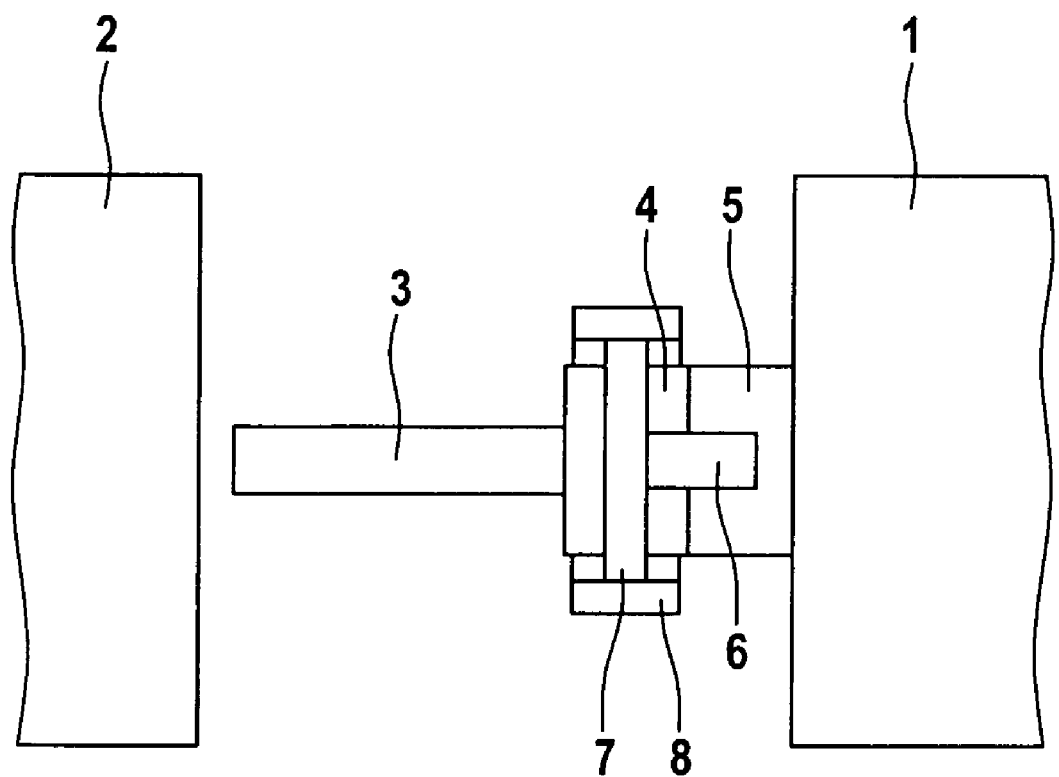
FIG. 1 shows a diagrammatic illustration of a suspension according to the invention between a filling machine and a sealing machine, in side view.

A filling pipe 3 is arranged between a filling machine 1, which is illustrated as a trimmed block, and a sealing machine 2, which is illustrated in the same way. The filling pipe 3 is connected to the filling machine 1 via a suspension which comprises a filling pipe connection piece 4 and a filling machine connection piece 5. The filling pipe 3 is connected to the filling pipe connection piece 4, for example, by screwing and the filling machine 1 is connected to the filling machine connection piece 5 in the same manner.

A bracket 6 is arranged on the filling machine connection piece 5, the bracket protruding laterally from the connection piece 5, then having a bend away from the filling machine and holding an elongate sleeve 7 at its end. The bracket 6 does not absolutely have to be arranged on the filling machine connection piece 5, an arrangement on the filling machine 1 is also conceivable. A bolt is mounted rotatably in a manner not shown in the interior of the sleeve 7. The ends of this bolt protrude over the two ends of the sleeve 7 and are fastened in a framework 8. The framework 8 together with the bolt forms a frame according to the invention.

Figure 3:
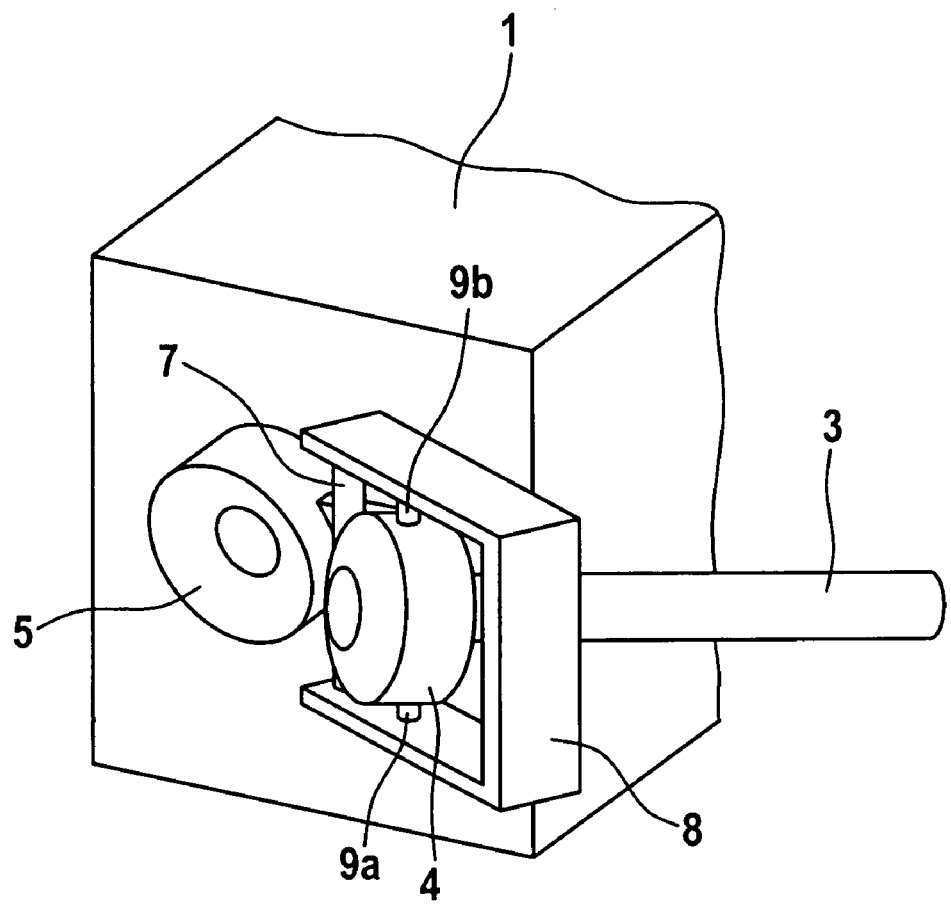
FIG. 3 shows the same suspension in a cleaning position in the same view.

Two bolts 9a and 9b are arranged lying opposite each other in the framework 8. Said bolts grasp into holes (not illustrated) in the filling pipe connection piece 4. A pivotability of the filling pipe connection piece about a first axis within the context of the invention is achieved in this manner. As can be seen in FIG. 3, that surface of the filling pipe connection piece 4 which comes into contact with the filling machine connection piece 5 is curved in a spherically convex manner and the corresponding surface of the filling machine connection piece 4 is curved in a complimentarily concave manner. As a result, the surfaces remain in contact with each other during a slight pivoting of the filling pipe 3, as suffices to pull on a new skin, so that, when the skin is pulled on, only little meat if any at all is lost. It would also be conceivable to work here with cylindrical surfaces.

Figure 2:
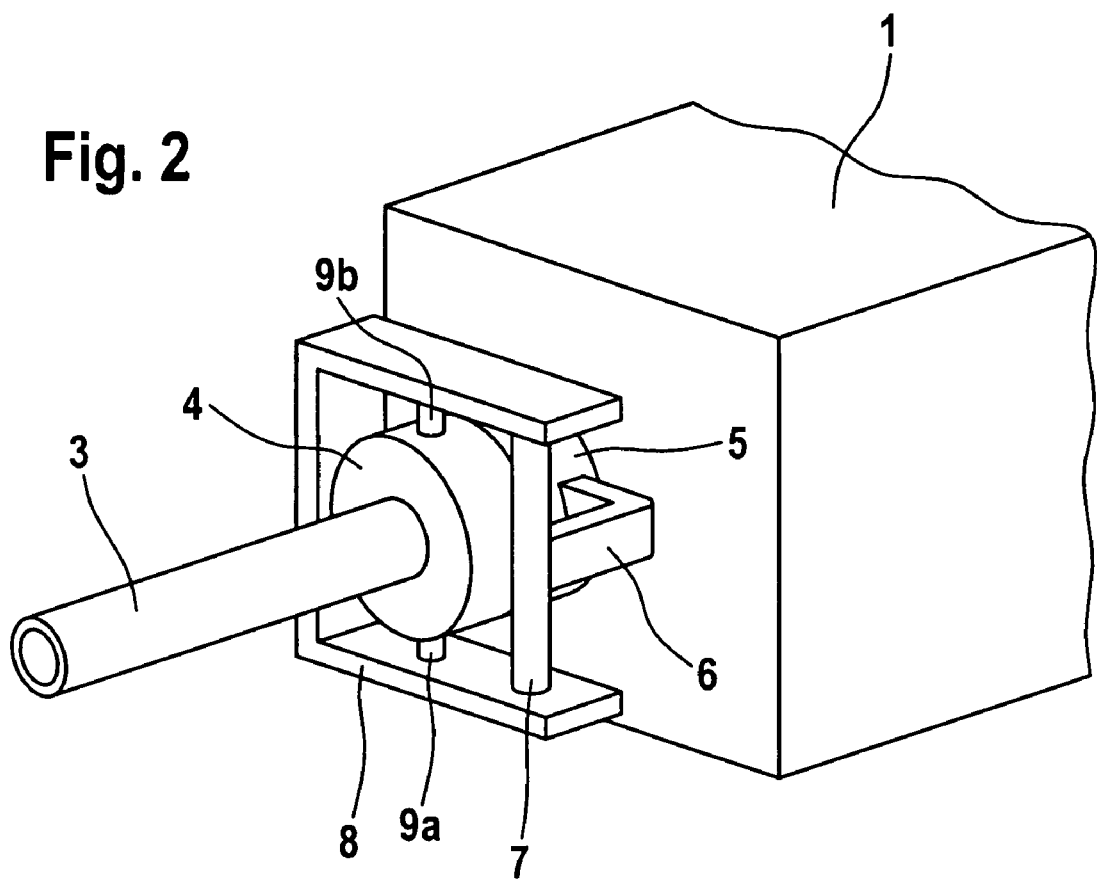
FIG. 2 shows, likewise in a diagrammatic illustration, the same suspension in a perspective view.

A locking in relation to the filling machine connection piece can be formed on the framework 8 in a manner not shown specifically, for example by means of a clamping mechanism, of which one component is arranged on that side of the framework 8 which lies opposite the sleeve 7 and the other component is arranged on the filling machine 1 or on the filling machine connection piece 5. As a result, the frame and, together with it, the filling pipe connection piece can be locked in the operating position shown in FIGS. 1 and 2.

The invention claimed is:

1. A suspension for a sausage filling pipe (3), with a filling pipe connection piece (4) and a filling machine connection piece (5), the filling pipe connection piece (4) being pivotable in relation to the filling machine connection piece (5) about a first pivot axis, characterized in that the filling pipe connection piece (4) is arranged on a frame (8) and is pivotable in relation to the latter about the first pivot axis, and the frame (8), for its part, is pivotable together with the filling pipe connection piece (4) in relation to the filling machine connection piece (5) about a second pivot axis into at least one cleaning position in which it holds the filling pipe connection piece (4) in a stable manner.

2. The suspension as claimed in patent claim 1, characterized in that, in at least one cleaning position of the frame (8), the filling pipe connection piece (4) is pivotable in relation to said frame about a cleaning axis.

3. The suspension as claimed in patent claim 2, characterized in that the filling pipe connection piece (4) is pivotable through 360° about the cleaning axis.

4. The suspension as claimed in claim 1, 2, or 3, characterized in that the frame (8) is lockable in relation to the filling machine connection piece (5) in an operating position.

* * * * *